United States Patent
Lafragette et al.

(10) Patent No.: US 10,305,853 B2
(45) Date of Patent: May 28, 2019

(54) NETWORK, A CLOUD-BASED SERVER, AND A METHOD OF REGISTERING FOR A SERVICE

(71) Applicant: Alcatel Lucent, Boulogne Billancourt (FR)

(72) Inventors: Jean-Luc Lafragette, Nozay (FR); Barbara Orlandi, Nozay (FR)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/579,639

(22) PCT Filed: Jun. 3, 2016

(86) PCT No.: PCT/EP2016/062679
§ 371 (c)(1),
(2) Date: Dec. 5, 2017

(87) PCT Pub. No.: WO2016/193446
PCT Pub. Date: Dec. 8, 2016

(65) Prior Publication Data
US 2018/0167354 A1    Jun. 14, 2018

(30) Foreign Application Priority Data

Jun. 5, 2015    (EP) .................................... 15290149

(51) Int. Cl.
| | |
|---|---|
| H04L 29/12 | (2006.01) |
| H04W 60/00 | (2009.01) |
| H04L 29/08 | (2006.01) |
| H04W 60/04 | (2009.01) |
| H04W 88/08 | (2009.01) |

(52) U.S. Cl.
CPC ...... *H04L 61/1582* (2013.01); *H04L 67/1097* (2013.01); *H04L 67/16* (2013.01); *H04W 60/00* (2013.01); *H04W 60/04* (2013.01); *H04L 67/2842* (2013.01); *H04W 88/085* (2013.01)

(58) Field of Classification Search
CPC ......... G06F 2009/45595; G06F 9/5077; G06F 2009/4557; H04L 67/10; H04L 67/1097; H04L 67/16; H04W 60/00; H04W 60/04
See application file for complete search history.

(56) References Cited

U.S. PATENT DOCUMENTS

| | | | |
|---|---|---|---|
| 2011/0176528 A1 | 7/2011 | Lu et al. | |
| 2012/0209934 A1* | 8/2012 | Smedman | H04L 12/5692 709/208 |

(Continued)

FOREIGN PATENT DOCUMENTS

| | | |
|---|---|---|
| CN | 103 906 068 A | 7/2014 |
| WO | WO 2014/098676 A1 | 6/2014 |

OTHER PUBLICATIONS

Di Liu et al., "The research and implementation of cloud computing platform based on docker," 11th International Computer Conference on Wavelet Active Media Technology and Information Processing, IEEE, pp. 475-478, XP032755651, 2014.

(Continued)

*Primary Examiner* — Julio R Perez
*Assistant Examiner* — Ernest G Tacsik
(74) *Attorney, Agent, or Firm* — Fay Sharpe LLP

(57) ABSTRACT

A method is provided of registering for a service a device residing in a small cell provided by a small cell base station, the small cell base station being associated with a cloud-based server, the server including a docker container for controlling the service in that small cell, the docker container having a docker port, and the method including the steps of: the device sending a request to register including a small cell identifier of the small cell, the server receiving the request and relating the small cell identifier in the request to (Continued)

a corresponding docker port identifier, the device being informed of the docker port identifier of the docker associated with that small cell.

14 Claims, 8 Drawing Sheets

(56) References Cited

U.S. PATENT DOCUMENTS

| | | | | |
|---|---|---|---|---|
| 2014/0317293 | A1* | 10/2014 | Shatzkamer | G06F 9/455 |
| | | | | 709/226 |
| 2015/0288622 | A1* | 10/2015 | Fargano | H04L 43/08 |
| | | | | 370/401 |
| 2015/0296392 | A1 | 10/2015 | Chen et al. | |
| 2016/0080207 | A1* | 3/2016 | Prakash | H04L 69/16 |
| | | | | 370/231 |
| 2016/0323361 | A1* | 11/2016 | Austel | H04L 67/10 |
| 2017/0244814 | A1* | 8/2017 | Yin | H04L 69/08 |

OTHER PUBLICATIONS

International Search Report for PCE/EP2016/062679 dated Jun. 28, 2016.
EP Application No. 15290149.2, Extended European Search Report, dated Dec. 4, 2015, 9 pp.
PCT Application No. PCT/EP2016/062679, Written Opinion of the International Searching Authority, dated Jun. 28, 2016, 8 pp.

* cited by examiner

NETWORK, A CLOUD-BASED SERVER, AND A METHOD OF REGISTERING FOR A SERVICE

FIELD OF THE INVENTION

The present invention relates a network, a cloud-based server, and a method of registering for a service a device residing in a small cell.

DESCRIPTION OF THE RELATED ART

Small cells are being developed that provide services well beyond mere connectivity of one user with a service or with another user. Many of these new services make use of the fact that a user terminal device in a small cell is proximal to the small cell base station, or the fact that multiple user terminal devices within a small cell are in proximity to each other. In consequence, such services may be specific to a given small cell or group of small cells, so may be run on the respective small cell base station(s). Of course executing such services at the small cell base stations may be limited by the local small cell base stations hardware constraints on processing, storage, size etc, and may be hard to evolve to meet increasing user demands. Now that virtualisation is possible, people have started to consider running such services from servers in the network operator's cloud. One option is to have a docker instantiated on a server for a small cell.

In this sense, a docker is a virtual container into which an Application and its library/dependencies are put, so that the container may be run on a server running Linux operating system. Accordingly, the use of dockers may be considered a type of operating system-level virtualisation on Linux. More specifically, dockers as available at the current time (Docker Inc, www.docker.com, release 1.6.0 16 Apr. 2015) use resource isolation features of the Linux kernel such as cgroups and kernel namespaces to allow independent containers to run within a single Linux server.

A docker container, as opposed to a traditional virtual machine, does not require or include a separate operating system. Instead it relies on the Linux kernel's functionality and uses resource isolation (CPU, memory, block I/O, network, etc.) and separate namespaces to isolate the application's view of the operating system.

By using docker containers, resources are isolated, services restricted, and processes provisioned to have a mostly private view of the operating system with their own process ID space, file system structure, and network interfaces. Multiple containers share the same kernel, but each container is constrained to only use a defined amount of resources such as CPU, memory and I/O.

SUMMARY

The reader is referred to the appended independent claims. Some preferred features are laid out in the dependent claims.

The present invention provides a method of registering for a service a device residing in a small cell provided by a small cell base station, the small cell base station being associated with a cloud-based server, the server including a docker container for controlling the service in that small cell, the docker container having a docker port, and the method including the steps of:

the device sending a request to register including a small cell identifier of the small cell, the server receiving the request and relating the small cell identifier in the request to a corresponding docker port identifier, and the device being informed of the docker port identifier of the docker associated with that small cell.

Some embodiments provide a method to address a docker associated with a given small cell.

Some embodiments provide a procedure to allocate a port number when launching a docker so as to provide the port number to devices that need to register with the function provided by the docker. To do this, a port allocation function on the server, keeps track of ports available on the server, allocates one port per cell identifier, and maintains a mapping table giving for a given cell the corresponding dockerised server function port associated with that given cell.

In some embodiments, a server can run several docker containers on a single server machine (hence having the same Internet Protocol address), and the dockers can then be easily addressed using that shared IP address and their associated port numbers. In this way, user terminals can readily address the virtualised server that provides the desired service in the small cell that the user terminal is located in. IP addresses are not wasted (as would happen if instead a different IP address was assigned to each docker).

In some embodiments, some small cache equipments are deployed within small cells, for example by mobile network operators. These equipments may be, for example direct access caches (DAC) by which we mean some relatively small cache equipments that are able to cache downlink and/or uplink digital content and provide that content to users using device-to-device connections, for example Wi-Fi direct. A DAC may be of a "stick-it-to-the-wall" type, so as to be simple to deploy. DACs may allow device-to-device communications with a user terminal, and the DAC access may be handled by a docker running in the operator's cloud, thus allowing ease of deployment.

In some embodiments, a docker is launched automatically upon a first DAC being installed in a small cell. (There would seem no point in launching a docker for a small cell that does not provide the corresponding service, for example because no DAC has yet been installed in that small cell).

In some embodiments a similar protocol is used for DAC registration as for user terminal registration for the service.

In some embodiments, a field may be added into the registration request indicating that the request is from a DAC, This request is sent to the IP address for the server handling the DAC and is received on the default port by the port allocation function. The port allocation function keeps track of which dockers have been launched for which cells and, if no docker has been launched for the given cell, launches the docker and allocates a port for that docker. If there is more than one DAC per cell, only installation of the first DAC triggers launch of a docker for that cell.

In some other embodiments, a dedicated message is sent that the equipment that will be seeking to register is a DAC.

Some embodiments allow easy bootstrapping of a server and launch of a docker in providing a device-to-device service in a small cell based on availability of DACs.

Preferably, the server inspects a mapping table relating docker ports and small cell identifiers so as to determine the docker port identifier relating to the small cell identifier in the request.

Preferably the service is a device-to-device service.

Preferably the device is a user terminal.

Alternatively, preferably the device is a direct access cache. Preferably the device is a second or subsequent direct access cache installed in a small cell, and a previous request to register the first direct access cache installed in the small cell triggered creation of the docker container for controlling the service in that small cell. Preferably the first direct access cache is identified as a direct access cache by a dedicated parameter in the corresponding request to register that triggered creation of the docker container.

Alternatively, preferably the first direct access cache is identified as a direct access cache in a dedicated message that triggered creation of the docker container.

The present invention also relates to a cloud-based server configured to register for a service a device residing in a small cell provided by a small cell base station, in which the server comprising a docker container for controlling the service in that small cell, the docker container having an associated docker port, the server being configured to receive a request to register from the device including a small cell identifier of the small cell, the server being configured to determine the docker port identifier that corresponds to the small cell identifier indicated in the request, and the server being configured to send a reply giving the docker port identifier associated with that small cell.

Preferably, the server comprises a mapping table relating docker ports and small cell identifiers, the server being configured to determine from the mapping table the docker port identifier that corresponds to the small cell identifier indicated the request.

Preferably the service is a device-to-device service.

Preferably a network is provided including the server, in which the device is a user terminal.

Alternatively preferably a network is provided including the server, in which the device is a direct access cache. Preferably the device is a second or subsequent direct access cache installed in a small cell, and a previous request to register the first direct access cache installed in the small cell triggered creation of the docker container for controlling the service in that small cell. Preferably the first direct access cache is identified as a direct access cache by a dedicated parameter in the corresponding request to register that triggered creation of the docker container.

Preferably the server is a local Access Network Discovery and Selection Function (Local-ANDSF) server.

BRIEF DESCRIPTION OF THE DRAWINGS

Embodiments of the present invention will now be described by way of example and with reference to the drawings, in which.

DETAILED DESCRIPTION

Two main embodiments are described in detail in turn in the below. Some other embodiments are described along the way.

First Example

Figure 1:
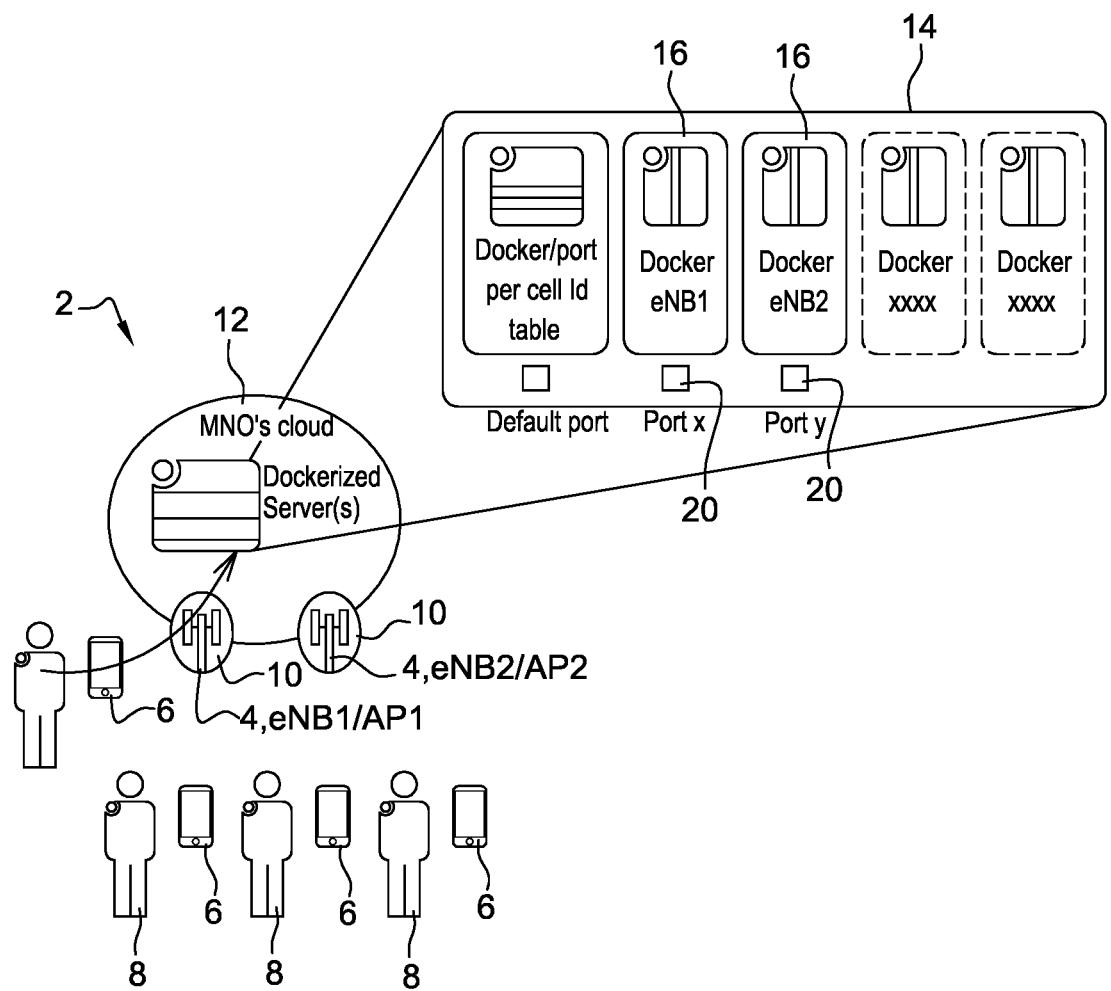
FIG. 1 is a diagram illustrating a system according to a first embodiment.

As shown in FIG. 1, in a first network 2, there are small cell base stations 4 that each include both cellular wireless (enhanced base station, eNodeB, eNB) functionality and wifi (access point, AP) functionality. Either or both of these two functionalities may be used for communication with user terminal devices 6 of users 8 within the respective small cells 10.

The small cell base stations 4 are connected to the Mobile Network Operator's cloud 12. The small cell base stations 4 are connected via network elements (not shown) to the Mobile Network Operator's cloud 12. The cloud 12 includes a server 14, which in this example is a Device-to-Device (D2D) server. The server 14 allows secure (e.g. wifi) connections between the user terminal devices 6 within a same small cell 10.

The server 14 involves the use of dockers 16, so may be considered 'dockerised'.

In this sense, a docker 16 is a virtual container into which an Application and its library/dependencies are put, so that the container may be run on the server which runs Linux operating system. Accordingly, the use of dockers may be considered a type of operating system-level virtualisation on Linux. More specifically, dockers as available at the current time (Docker Inc, www.docker.com, release 1.6.0 16 Apr. 2015) use resource isolation features of the Linux kernel such as cgroups and kernel namespaces to allow independent containers to run within a single Linux server.

The server 14 has an IP address. The server 14 may have multiple dockers 16 launched, one for each small cell in which the service is to be provided. Each docker 16 has an associated input/output port 20 that is identified by a corresponding port number.

The combination of IP address and port number is useful to user terminals 6 in a small cell 10 for service provision by the docker 16 associated with that small cell.

Operation

Figure 2:
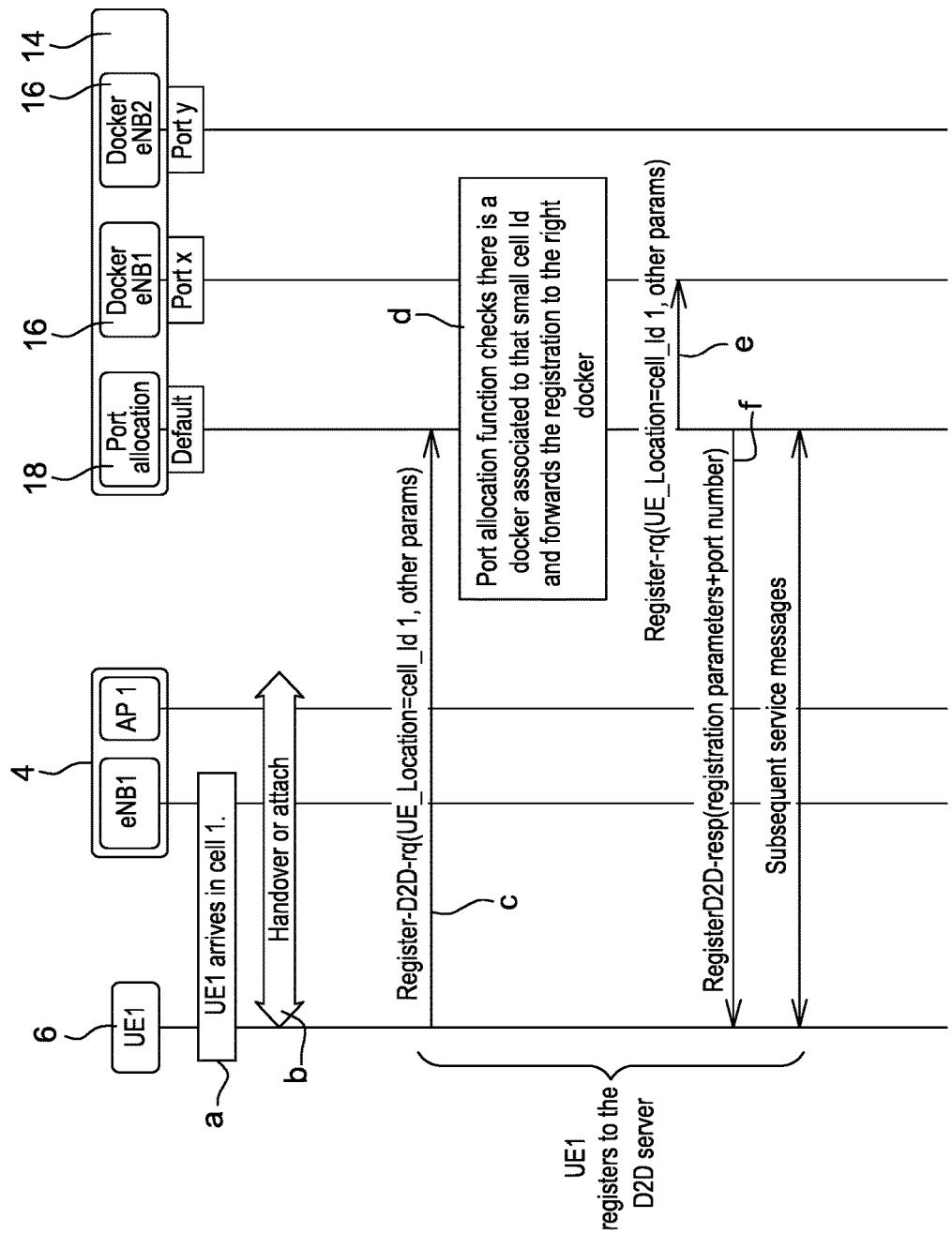
FIG. 2 is a message sequence diagram illustrating operation of the system shown in FIG. 1 in identifying to a user terminal device the allocated docker port for the small cell to which the user terminal is connected.

As shown in FIG. 2, a user terminal 6 (UE1) arrives (step a) in the small cell 10 and connects (step b) to the small cell base station 4 (eNB1/AP1).

The user terminal UE1 seeks to register to the device-to-device (D2D) server to obtain a service, namely local device to device communication within the small cell. For this purpose, the user terminal UE1 has received the Internet Protocol (IP) address of the server 14 and a default port used to access the server, either from its initial configuration (not shown) or by Domain Name System (DNS) query (not shown). This registration is done by the following steps.

The user terminal UE1 sends (step c) a registration request to the server 14 that includes the small cell identifier (Cell_Id 1), specifically to a port allocation function 18 of the server 14.

The port allocation function 18 checks (step d) to determine whether there is a specific docker 16 associated with that small cell, and if so, both forwards (step e) the registration request to the correct docker 16 and either replies (step f) to the user terminal or lets the specific docker 16 reply so as to give the port number identifying the port 20 of that docker 16 to the user terminal UE1 for subsequent use.

Mapping Small Cells to Docker Ports

The port allocation function 18 holds a record of which docker 16 (identified by a corresponding port number) in the server 14 has been assigned to which small cell base (identified by a Cell_Id).

At the time of launching a docker 16 to serve user terminals 6 of a given small cell, the port allocation function 18 of the server 14 searches (not shown in FIG. 2) to determine available free ports and allocates one port to that docker for that small cell. The port allocation function 18 then stores a record of which port was allocated to that small cell.

In other similar examples (not shown) the server is a local Access Network Discovery and Selection Function (Local-ANDSF) server, an Uplink (UL) cache server or any other type of server that provides a useful service on a local-to-small-cell basis.

Second Example

Figure 3:
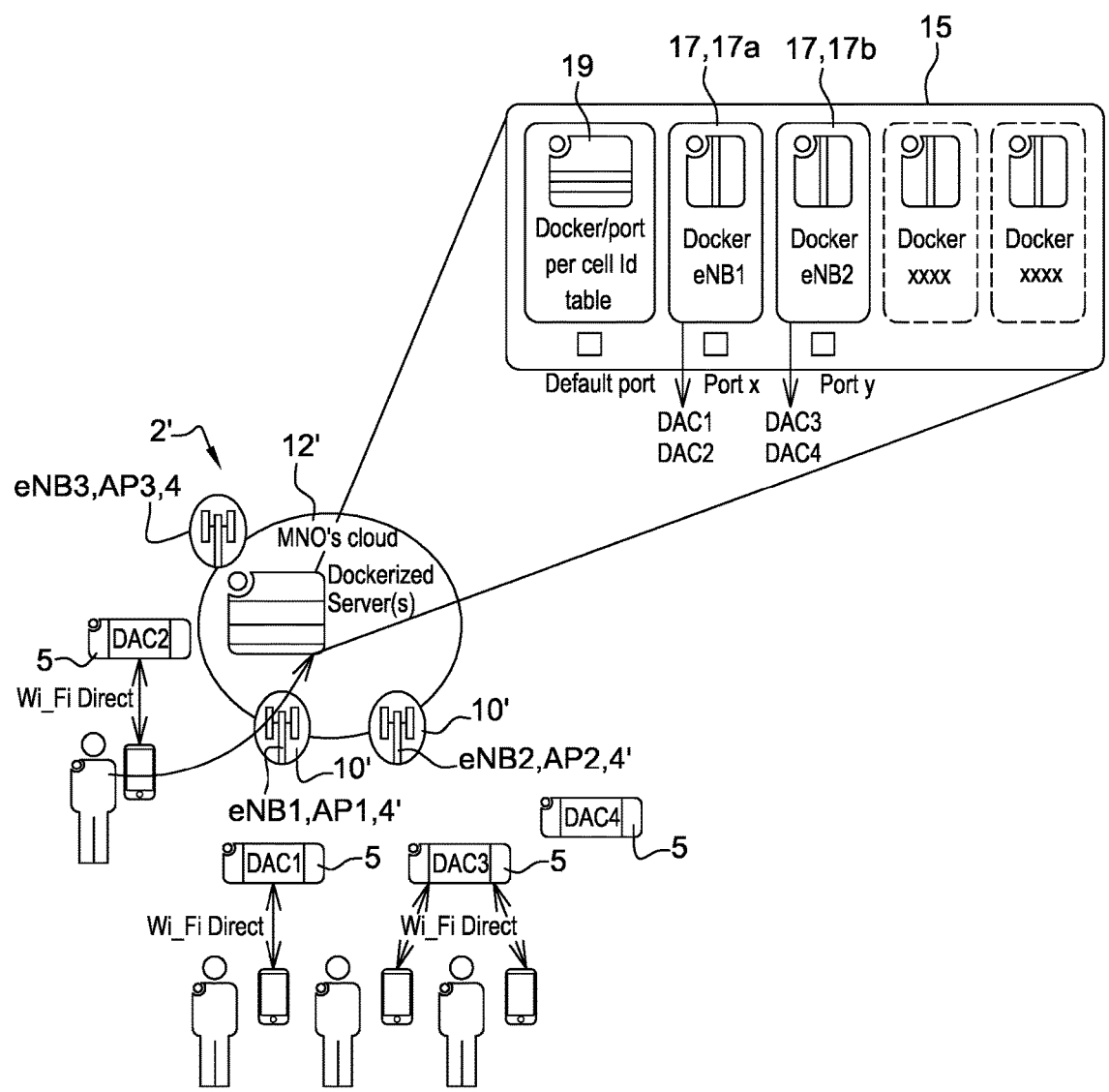
FIG. 3 is a diagram illustrating a system according to a second embodiment.

As shown in FIG. 3, in a second network 2', there are small cell base stations 4' that each include both cellular wireless (enhanced base station, eNodeB, eNB) functionality and wifi (access point, AP) functionality. Either or both of these two functionalities may be used for communication with user terminal devices 6' of users 8 within the respective small cells 10'. For simplicity in FIG. 3 just three small cells 4' are shown.

The small cell base stations 4' are connected via network elements (not shown) to the Mobile Network Operator's cloud 12'.

In addition to the small cell base stations 4' some Direct Access Caches (DACs) 5 are also deployed by which we mean some relatively small cache equipments 5 that are able to cache downlink and/or uplink digital content and provide that content to users using device-to-device connections, for example Wi-Fi direct. A DAC 5 is of a "stick-it-to-the-wall" type, so as to be simple to deploy.

The cloud 12' includes a server 15 which in this example is a DAC server. The server 15 allows secure (e.g. wifi) connections between the user terminal devices 6 within a same small cell 10'.

In this example, the DAC server 15 allows downlink content that was already downloaded by one or some users to be stored in the DAC 5 so made available via wi-fi direct to other users in the small cell 10'. In another similar example, the DAC server 15 is an uplink cache server/scheduler.

The server 15 involves the use of dockers 17, so may be considered 'dockerised'. A docker is a virtual container as explained above in relation to the example shown in FIG. 1. The server 15 runs several dockers on the same machine, all the dockers share the same Internet Protocol address, which is the IP address of the server, and so are differentiated by dockers for a small cell having a corresponding docker port number assigned.

In this example, a first small cell 4' namely eNB1/AP1 has two associated DACs 5, namely DAC1 and DAC 2 as shown in FIG. 3. There is one docker 17a running for these two DACs.

Also, a second small cell 4' namely eNB2/AP2 has two associated DACs 5, namely DAC3 and DAC 4 as also shown in FIG. 3. There is one docker 17b running for these two DACs.

The third small cell 4' shown, namely eNB3/AP3 has no DAC and hence no associated docker running on the server 15.

In the server 15, a port allocation function 18' includes a record table 19 of which docker port maps to which small cell. The table 19 relates the small cell identifier (Cell_ID) to associated docker port.

Setting Up a Docker

Figure 4:
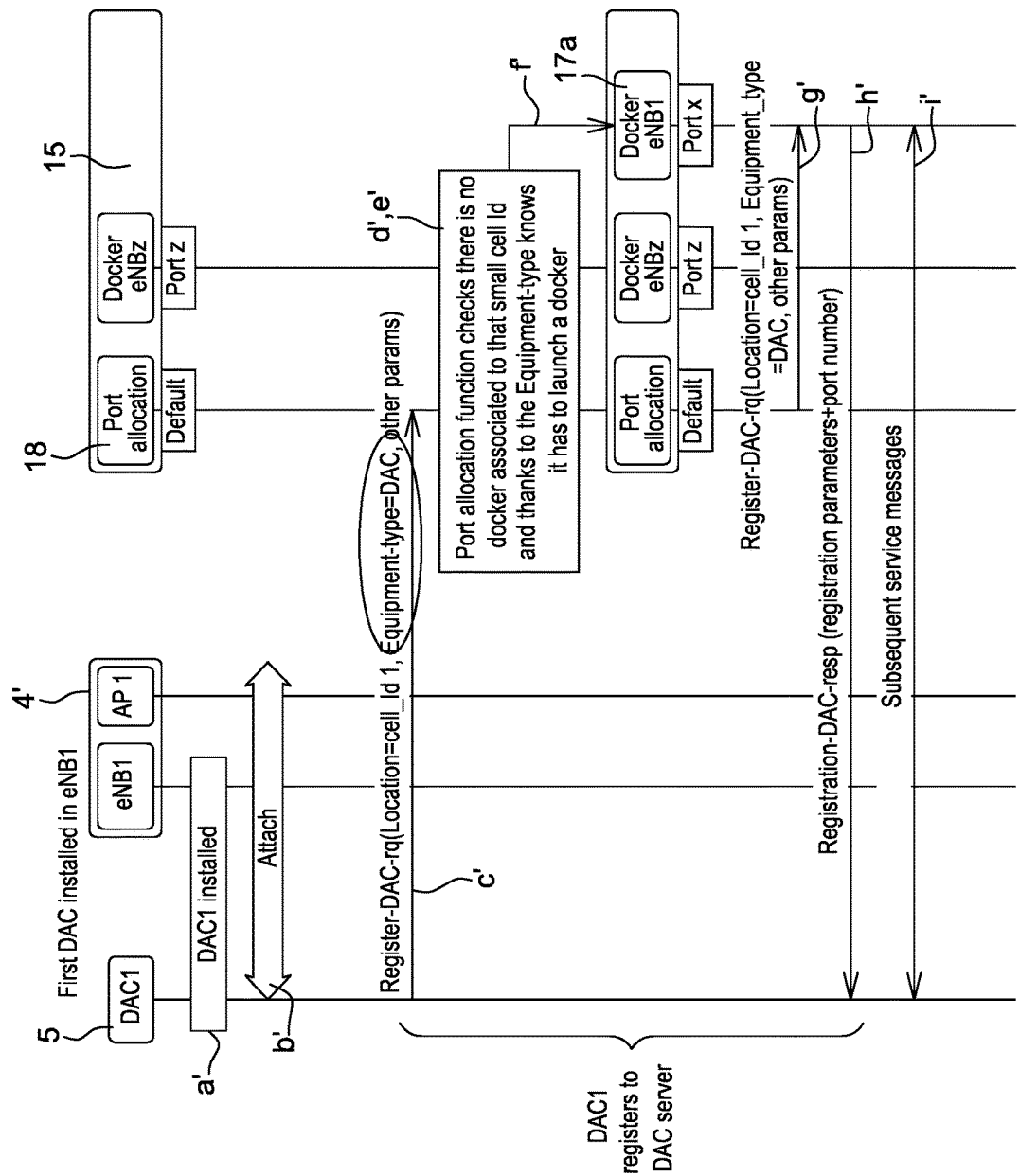
FIG. 4 is a message sequence diagram illustrating operation of the system shown in FIG. 3 in launching a docker and identifying to a first Direct Access Cache (DAC) device the allocated docker port for the small cell to which the DAC is connected.

As shown in FIG. 4, docker 17 launch happens as part of registration at the server of a first Direct Access Cache (DAC) in the small cell.

In this example, initially no DAC is installed, so no DAC service docker is provided. A first DAC (namely DAC1) is then installed (step a') at a first small cell 4' which is connected to its wireless function eNB1.

The DAC (DAC1) is attached (step b') to the small cell (by cellular telecommunications as the DAC includes a Subscriber Identity Module (SIM) card.

In an otherwise similar alternative example (not shown) the first DAC is connected instead to the wi-fi function AP1 of the small cell. In a second otherwise similar alternative example (not shown) the first DAC is connected by wire to the small cell.

The DAC (DAC1) then seeks to register at the server 15 by formulating and sending (step c') a registration request message.

This registration request message includes the location of DAC1, namely its small cell identifier (Cell_Id). The message also includes a field (Equipment-type=DAC) indicating the nature of the equipment so that the server 15 recognises that the server 15 must launch a docker 17a for that service in that small cell.

This registration message is sent to the IP address of the server to be received on the default port of the server 15.

The port allocation function 18 checks (step d') that there is no docker already launched that is associated with that small cell identifier (Cell-Id) and determines (step e') from the Equipment_type=DAC field, that a docker for providing DAC service in that small cell is desirable.

The port allocation function 18 launches (step f) a docker (Docker ENB1) 17a and forwards (step g') the registration request message to that docker 17a.

The docker 17a replies (step h') with a registration response that includes the docker port number. This message is received by the DAC1 and is used (step i') thereafter in relating the DAC to the docker in subsequent messages relating to that service.

Registration of Second and Subsequent Direct Access Cache at the Server

Figure 5:
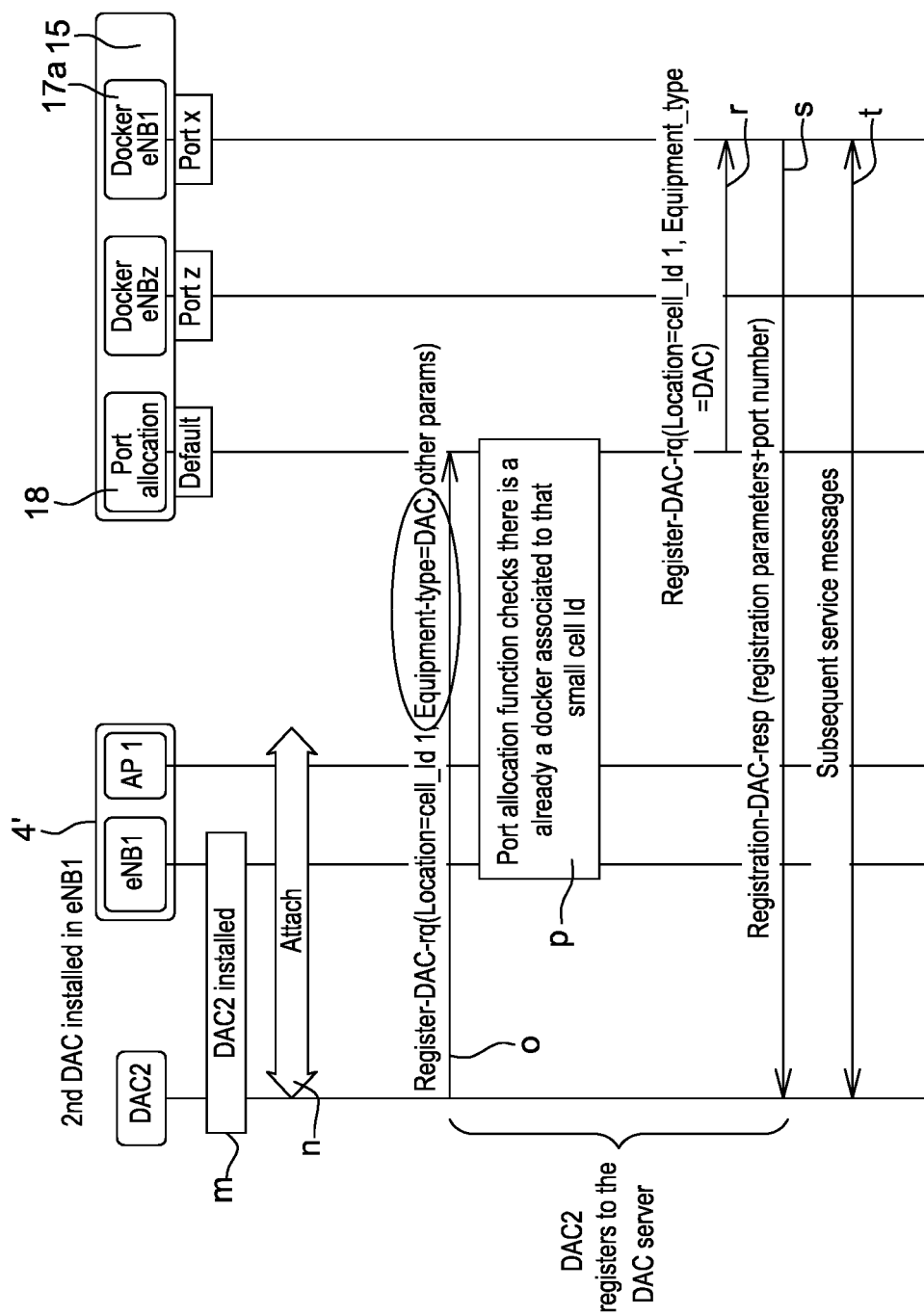
FIG. 5 is a message sequence diagram illustrating operation of the system shown in FIG. 3 in identifying to a second Direct Access Cache (DAC) device the allocated docker port for the small cell to which the DAC is connected.

As shown in FIG. 5, a second DAC (DAC2) is installed (step m) in the same small cell as DAC1.

This second DAC (DAC2) is attached (step n) to the small cell (by cellular telecommunications as the DAC includes a Subscriber Identity Module (SIM) card.

The DAC (DAC2) then seeks to register at the server 15 by formulating and sending (step o) a registration request message. This registration request message includes the location of DAC2, namely its small cell identifier (Cell_Id). The message also includes a field (Equipment-type=DAC) indicating the nature of the equipment.

The port allocation function 18 determines (step p) that there is already a docker associated with that small cell identifier (Cell-Id) for the DAC service (equipment-type=DAC)

The port allocation function 18 forwards (step r) the registration request message to that docker 17a.

The docker 17a replies (step s) with a registration response that includes the docker port number. This message is received by the DAC1 and is used (step t) thereafter in relating the DAC to the docker port in subsequent messages relating to that service.

User Terminal Registering for the Dockerised Service

Figure 6:
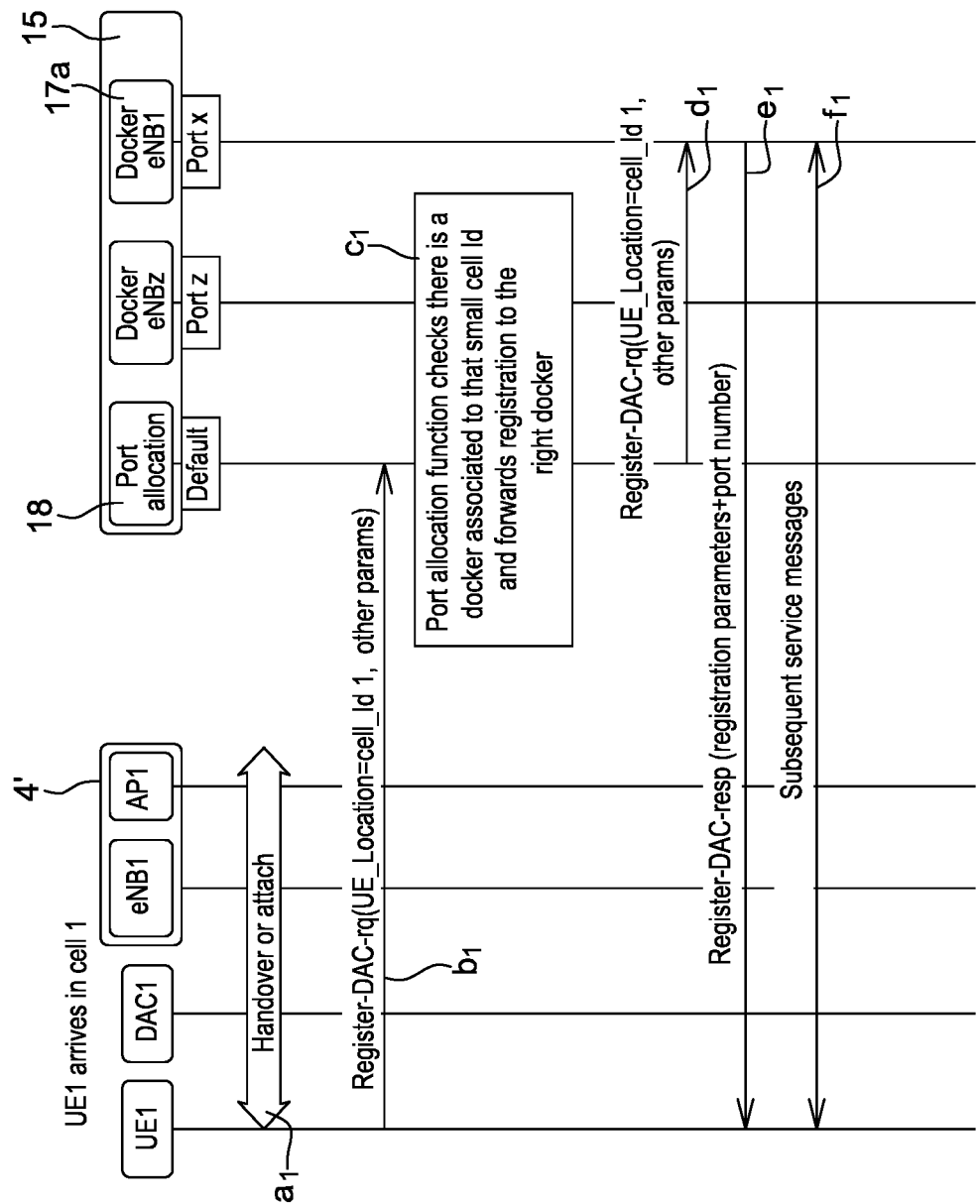
FIG. 6 is a message sequence diagram illustrating operation of the system shown in FIG. 3 in identifying to a user terminal device the allocated docker port for the small cell to which the user terminal is connected.

As shown in FIG. 6, a first user terminal UE1 arrives in the small cell 4' (eNB1/AP1) and so handovers/attaches (step $a_1$) to the small cell.

The user terminal UE1 seeks to register at the server 15 by formulating and sending (step $b_1$) a registration request message. This registration request message includes the location of the user terminal, namely its small cell identifier (Cell_Id).

The port allocation function 18 determines (step $c_1$) that there is a docker 17a associated with that small cell identifier (Cell-Id) for the DAC service. Accordingly, the port allocation function 18 forwards (step $d_1$) the registration request message to that docker 17a.

The docker 17a replies (step $e_1$) with a registration response that includes the docker port number. This message is received by the user terminal UE1 and is used (step $f_1$) thereafter in relating the DAC to the docker port in subsequent messages relating to that service.

Figure 7:
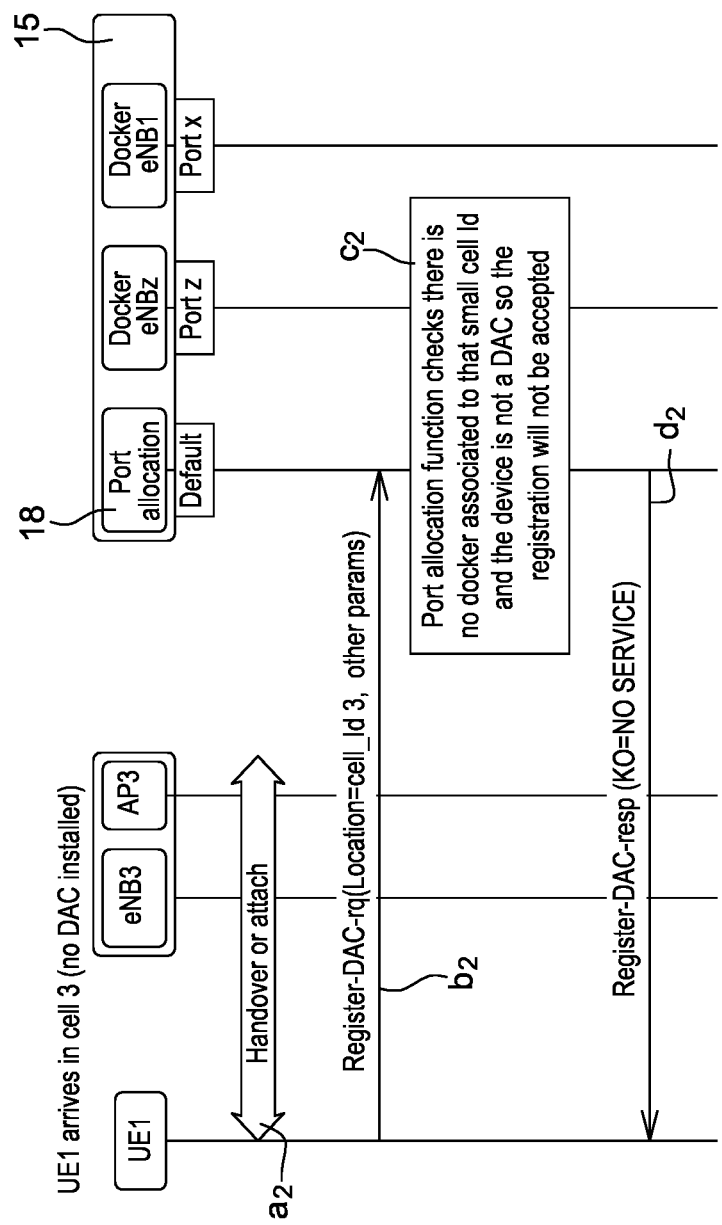
FIG. 7 is a message sequence diagram provided for comparison and illustrating operation of a system in which there is no DAC connected to a small cell so no docker port is identified to a user terminal connected to that small cell.

User Terminal Seeking to Register for a Dockerised Service that is not Available FIG. 7 is presented for completeness.

As shown in FIG. 7, a user terminal UE1 becomes connected (step $a_2$) to a small cell 4' namely eNB3/AP3 for which there is no Direct Access Cache and hence for which a DAC service is not provided.

The user terminal UE1 seeks to register at the server 15 by formulating and sending (step $b_2$) a registration request message. This registration request message includes the location of the user terminal, namely its small cell identifier (Cell_Id).

The port allocation function 18 determines (step $c_2$) that there is not a docker associated with that small cell identifier (Cell_Id) for the DAC service and the registration request is not from a DAC itself seeking to launch an associated docker. Accordingly, the port allocation function 18 replies (step $d_2$) with a response that the service is not available.

Alternative Approach to Setting Up a Docker

In a similar embodiment to that described with reference to FIGS. 3 to 7, instead of using a dedicated field to indicate that it is a DAC requesting to register, a dedicated message can be used instead.

Figure 8:
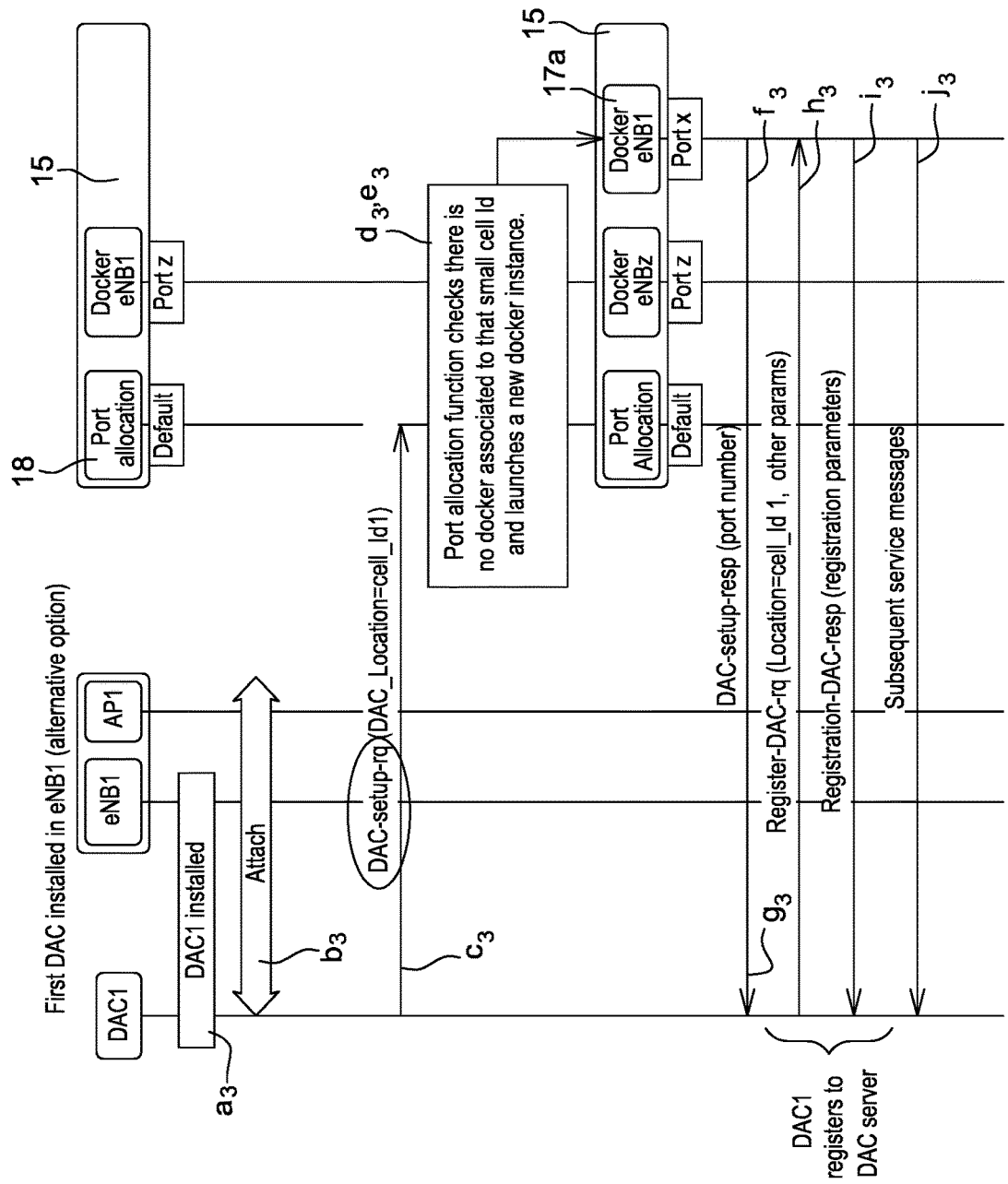
FIG. 8 is a message sequence diagram illustrating operation of system according to a third embodiment in launching a docker and identifying to a first Direct Access Cache (DAC) device the allocated docker port for the small cell to which the DAC is connected.

As shown in FIG. 8, docker launch happens as part of registration process of a first Direct Access Cache (DAC) at the server.

In this example, initially no DAC is installed, so no DAC service docker is provided. A first DAC (namely DAC1) is then installed (step $a_3$) at a first small cell 4' which is connected to its wireless function eNB1.

The DAC (DAC1) is attached (step $b_3$) to the small cell (by cellular telecommunications as the DAC includes a Subscriber Identity Module (SIM) card.

The DAC (DAC1) then notifies its presence by sending (step $c_3$) a DAC-docker set-up request that includes the location of DAC1, namely its small cell identifier (Cell_Id).

The port allocation function 18 checks (step $d_3$) that there is no docker already launched that is associated with that small cell identifier (Cell_Id) and launches (step $e_3$) a docker (Docker ENB1) 17a.

The docker 17a replies (step $f_3$) with a set-up response that includes the docker port number. This set-up message is received (step $g_3$) by the DAC1

In a further handshaking process, the DAC1 sends (step $h_3$) a further registration request via the indicated docker port to the now launched docker 17a in the DAC server 15. The docker 17a replies (step $i_3$) so as to give registration parameters to the DAC1.

In subsequent messages thereafter, the docker port number indicated in the setup response message is also used (step $j_3$) in relating the DAC to the docker relating to that service.

Some Further Examples

The present invention may be embodied in other specific forms without departing from its essential characteristics.

As mentioned above, the server may be a D2D server, a DAC server, a local Access Network Discovery and Selection Function (Local-ANDSF) server, an Uplink (UL) cache server or any other type of server that provides a useful service on a local-to-small-cell basis.

In some examples, a small cell base station may use WiFi functionality so be an Access Point. The device, for example the user terminal or direct access cache, in the small cell that is seeking to register for the service sends the small cell identifier in the form of a WiFi location, namely SSID and BSSID. SSID denotes Service Set Identification and BSSID denotes Basic Service Set Identification. The server receives the request and relates that small cell identifier to the corresponding docker port number.

The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A person skilled in the art would readily recognize that steps of various above-described methods can be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. Some embodiments involve computers programmed to perform said steps of the above-described methods.

The invention claimed is:

1. A method for registering a device for a service provided by a small cell base station, the method including:
    the small cell base station being connected to a cloud-based server, the cloud-based server including a virtual container controlling the service in the small cell base station, wherein the virtual container comprises an input/output port, the device sending a request to register for the service, the request including a small cell identifier (Cell ID) of the small cell base station, the cloud-based server receiving the registration request for the service, and the cloud-based server further:

inspecting a mapping table relating input/output ports associated with virtual containers and small cell identifiers to determine the port identifier associated with the virtual container related to the small cell identifier (Cell ID) in the request, the device receiving a reply from the cloud-based server regarding the determined port identifier of said virtual container controlling the service in the small cell base station.

2. The method according to claim 1, in which the service is a device-to-device service.

3. The method according to claim 1, in which the device is a user terminal.

4. The method according to claim 1, in which the device is a direct access cache device able to cache digital content for provision to users using device-to-device connections.

5. The method according to claim 4, in which the device is a second or subsequent direct access cache device installed in a small cell, and a previous request to register a first direct access cache device installed in the small cell triggered creation of the virtual container for controlling the service in the small cell.

6. The method according to claim 5, in which the first direct access cache device is identified by a dedicated parameter in the corresponding request to register that triggered creation of the virtual container.

7. The method according to claim 5, in which the first direct access cache device is identified in a dedicated message that triggered creation of the virtual container.

8. A cloud-based server
configured to register a device for a service provided by a small cell base station, the cloud-based server comprising:
a virtual container configured to control the service in the small cell base station, wherein the virtual container comprises an input/output port, and
a mapping table configured to relate input/output ports associated with virtual containers and small cell identifiers,
the cloud-based server configured to receive a request to register for the service from the device, the request including a small cell identifier (Cell ID) of the small cell base station,
the cloud-based server configured to inspect the mapping table to determine a port identifier associated with the virtual container that corresponds to the small cell identifier (Cell ID) indicated in the request, and
the cloud-based server configured to send a reply to the request giving the determined port identifier of said virtual container configured to control the service in the small cell base station.

9. The cloud-based server according to claim 8, in which the service is a device-to-device service controlled by the server.

10. The cloud-based server according to claim 8, in which the device is a user terminal.

11. The cloud-based server according to claim 8, in which the device is a direct access cache device able to cache digital content for provision to users using device-to-device connections.

12. The cloud-based server according to claim 11, in which the device is a second or subsequent direct access cache device installed in a small cell, and a previous request to register a first direct access cache device installed in the small cell triggered creation of the virtual container for controlling the service in the small cell.

13. The cloud-based server according to claim 12, in which the first direct access cache device is identified by a dedicated parameter in the corresponding request to register that triggered creation of the virtual container.

14. The cloud-based server according to claim 12, in which the first direct access cache device is identified in a dedicated message that triggered creation of the virtual container.

* * * * *